(12) United States Patent
Jurk

(10) Patent No.: US 7,711,151 B2
(45) Date of Patent: May 4, 2010

(54) SYSTEM AND METHOD FOR DETERMINING PHYSICAL CHARACTERISTICS OF AN UNRESTRAINED ANIMAL

(76) Inventor: Scott Jurk, 402 San Gabriel Blvd., Georgetown, TX (US) 78628-7621

(*) Notice: Subject to any disclaimer, the term of this patent is extended or adjusted under 35 U.S.C. 154(b) by 848 days.

(21) Appl. No.: 11/557,453

(22) Filed: Nov. 7, 2006

(65) Prior Publication Data
US 2007/0110281 A1 May 17, 2007

Related U.S. Application Data

(60) Provisional application No. 60/736,099, filed on Nov. 14, 2005.

(51) Int. Cl.
*G06K 9/00* (2006.01)
(52) U.S. Cl. .................... 382/110; 382/203; 348/89; 348/135; 348/140; 348/143
(58) Field of Classification Search ................. 382/110, 382/203–205; 348/89, 135, 140, 143
See application file for complete search history.

(56) References Cited

U.S. PATENT DOCUMENTS

| | | | |
|---|---|---|---|
| 5,483,441 A | 1/1996 | Scofield | |
| 5,576,949 A | 11/1996 | Scofield | |
| 6,877,460 B1* | 4/2005 | Ellis | 119/842 |
| 7,039,220 B2 | 5/2006 | Kreisel | |
| 7,209,579 B1* | 4/2007 | Weisenberger et al. | 382/128 |
| 2003/0173743 A1* | 9/2003 | Brink et al. | 273/297 |
| 2005/0257748 A1 | 11/2005 | Kriesel | |
| 2007/0110281 A1* | 5/2007 | Jurk | 382/110 |
| 2008/0021344 A1* | 1/2008 | Jung et al. | 600/549 |
| 2008/0317313 A1* | 12/2008 | Goddard et al. | 382/131 |

* cited by examiner

*Primary Examiner*—Aaron W Carter
(74) *Attorney, Agent, or Firm*—Taylor Russell & Russell, PC

(57) ABSTRACT

The invention provides a computer software means for determining physical characteristics of an unrestrained animal by enabling a user to interact with one or more images of the unrestrained animal on a graphical user interface connected to a computer. Using the graphical user interface, the user is able to designate piecewise linear and circumferential measurements of selected animal features on the one or more images. The computer software program receives one or more selected images of an unrestrained animal, displays the one or more images on the graphical user interface, receives a user designated animal type and calibration measurements of animal size indicia, receives user selected measurements of animal physical characteristic from the one or more images and adjusts the measurements based on the calibration measurements of animal physical size, and displays the selected images, adjusted and computed measurements and estimated measurement error on the graphical user interface.

24 Claims, 18 Drawing Sheets

SYSTEM AND METHOD FOR DETERMINING PHYSICAL CHARACTERISTICS OF AN UNRESTRAINED ANIMAL

This application claims benefit of U.S. Provisional Application No. 60/736,099, filed on Nov. 14, 2005.

BACKGROUND

The invention relates generally to determining and quantifying characteristics of unrestrained animals based on images of the subject animals. More particularly, the invention provides a means for identifying, measuring and collecting numerical characteristics of animals in a wild and unrestrained state. This capability of providing numerical characteristics of unrestrained animals is an important tool to users such as hunters, wildlife managers, game breeders, ranchers and biologists. It enables a user to study and evaluate animal characteristics that relate to age, genetics and nutrition, such as size, horn and antler development, and growth rate. The invention relies on identifying the particular type of animal subject under scrutiny and several key measurements that provide indicia of size of the animal subject type under scrutiny.

In the recent past, determining physical characteristics of wild and unrestrained animals in any significant number is difficult and problematical at best. Although the techniques for sedating or otherwise restraining animals in the wild in order to determine physical measurements is a proven and reliable method, it does not lend itself for assessing physical characteristics of a large number of animals over a reasonably short time frame, much less in a nocturnal environment. The broad availability of high quality digital game and trail cameras has provided the opportunity to analyze images of animals in the wild using computer imaging techniques. Many of these cameras provide viewing capability for operation in nocturnal and low light level environments, as well as attachments for enabling remote, unattended operation. There are several imaging tools available for measuring characteristics of restrained animals, such as livestock, but these are not applicable to wild and unrestrained animals. While there are many computer based tools available for image enhancement and editing, there are no tools readily available for easily assessing characteristics of wild and unrestrained animals using computer analysis techniques. Such a tool finds use with many users such as hunters, wildlife managers, game breeders, ranchers and biologists who would like to determine animal characteristics without the need for restraining the animals in order to determine the characteristics.

It is an object of the present invention to provide a method and system for determining various animal physical characteristics by using one or more reference measurements for establishing scale factors from a recorded image of an unrestrained animal. It is a further object of the invention to provide an estimate of measurement error in evaluating an animal image. It is an object of the invention to provide one or more images for determining reference measurements. It is an object of the invention to determine physical characteristics of an unrestrained animal by selecting measurements between two or more points on an image of an unrestrained animal. It is an object of the invention to determine volume and mass of an unrestrained animal by evaluating an image of the unrestrained animal. It is an object of the present invention to provide the methods by executing instructions in a computer program. It is an object of the invention to provide a graphical user interface for interactively selecting features of an unrestrained animal image. It is a further object of the invention to determine animal characteristics of animals selected from the group consisting of northern whitetail deer, southern whitetail deer, mule deer, moose, caribou, elk, black bear, brown bear, goat and sheep. It is a further object of the invention to determine animal characteristics of animals selected from the group consisting of an exotic species and a horned species. It is a further object of the invention to evaluate one or more unrestrained animal images using game scoring metrics. It is an object of the invention to provide a summary of the measured unrestrained animal characteristics.

SUMMARY

The present invention is a system and method for determining and quantifying characteristics of unrestrained animals based on one or more images of the subject animals. It provides a means for identifying, measuring and collecting numerical characteristics of animals in a wild and unrestrained state. The method for analyzing an image includes determining one or more reference measurements that may be used to calibrate other animal features from the image. The method enables multiple images of the same animal to be analyzed for improved accuracy over a single image. The method compares multiple reference measurements to estimate an accuracy of the image analysis.

The system includes a graphical user interface for selecting features of one or more images, a configurable state machine and an analysis engine for calculating animal characteristics from selected locations on one or more images. The state machine can be loaded with a scoring system for various animal types, and which enables operation by both experienced and inexperienced users by leading users through steps of the evaluation.

An embodiment of the present invention includes a software method implemented by instructions on a computer system for determining physical characteristics of an unrestrained animal and displaying the characteristics to a user on a graphical user interface, comprising the steps of receiving one or more captured digital images of an unrestrained animal and storing the one or more images in a digital memory device, processing at least one digital image of the unrestrained animal in a digital processor and displaying the at least one digital image on a graphical user interface, receiving a designation of the type of unrestrained animal in the at least one digital image, calibrating the animal size in the at least one digital image by accepting measurements based on user input of known size indicia for the designated animal type in the at least one image, determining measurements based on user input of the unrestrained animal in the at least one digital image for determining physical characteristics of the unrestrained animal, adjusting the measurements of the unrestrained animal based on the calibrated animal size, and displaying the at least one digital image, adjusted measurements, computed measurements, a measurement summary, and estimated measurement errors on the graphical user interface.

Another embodiment of the present invention is a software system implemented on a computer for determining physical characteristics of an unrestrained animal and displaying the characteristics to a user on a graphical user interface, comprising means for receiving one or more captured digital images of an unrestrained animal and storing the one or more images in a digital memory device, means for processing at least one digital image of the unrestrained animal in a digital processor and displaying the at least one digital image on a graphical user interface, means for receiving a designation of the type of unrestrained animal in the at least one digital image, means for calibrating the animal size in the at least one digital image by accepting measurements based on user input of known size indicia for the designated animal type in the at least one digital image, means for determining measurements based on user input of the unrestrained animal in the at least one digital image for determining physical characteristics of the unrestrained animal, means for adjusting the measurements of the unrestrained animal based on the calibrated animal size, and the graphical user interface for displaying the at least one digital image, adjusted measurements, computed measurements, a measurement summary, and estimated measurement errors on the graphical user interface.

Yet another embodiment of the present invention is a computer readable medium containing instructions on a computer system for determining physical characteristics of an unrestrained animal and displaying the characteristics to a user on a graphical user interface by receiving and processing at least one digital image of the unrestrained animal in a digital processor and displaying the at least one digital image on a graphical user interface, receiving a designation of the type of unrestrained animal in the at least one digital image and calibrating the animal size based on user input of known size indicia for the designated animal type in the at least one digital image, determining physical characteristics of the unrestrained animal based on user input of measurements of the unrestrained animal in the at least one digital image, adjusting the physical characteristics of the unrestrained animal based on the calibrated animal size, and displaying the at least one digital image, adjusted measurements, computed measurements, a measurement summary, and estimated measurement errors on the graphical user interface.

BRIEF DESCRIPTION OF THE DRAWINGS

These and other features, aspects and advantages of the present invention will become better understood with regard to the following description and accompanying drawings wherein.

DETAILED DESCRIPTION OF THE DRAWINGS

The following description represents but one possible embodiment of the present invention, and includes an analysis of a whitetail deer. Any animal may be analyzed according to the present invention if a suitable template, evaluation rules and reference feature data are available for the particular animal. Other candidate may include northern whitetail deer, bear, cougar, elk, mule deer, blacktail deer, moose, caribou, goat, sheep, an exotic species and a horned species. Although the following described embodiments include two distinct images of an animal, a single image will also provide useful results, albeit with reduced accuracy.

Figure 1:
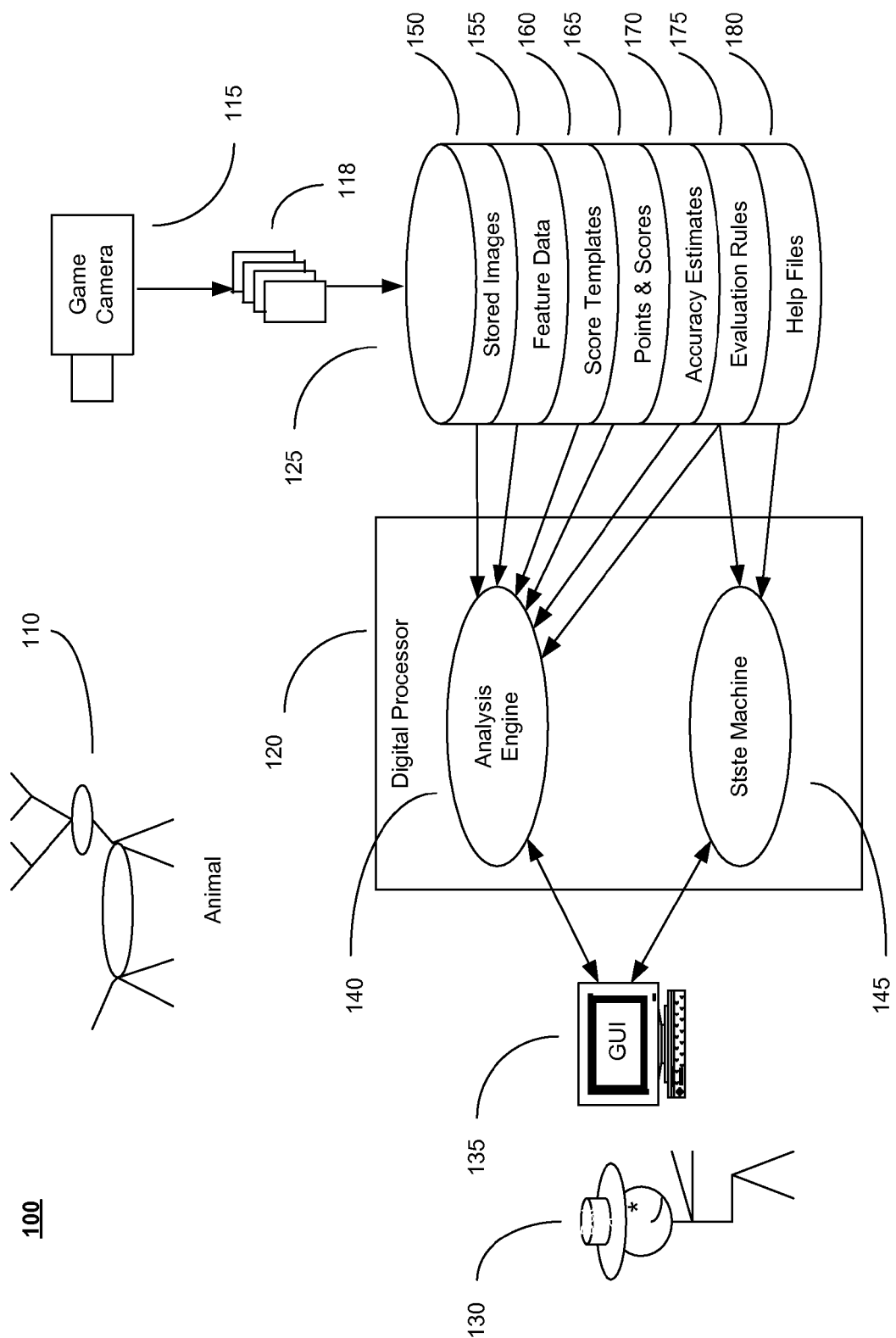
FIG. 1 depicts a system diagram of an embodiment of the present invention.

Turning to FIG. 1, FIG. 1 depicts a system diagram 100 of an embodiment of the present invention. A game camera 115 capable of recording digital images is normally set up in a location where an animal of interest 110 is likely to visit. Images 118 of the animal 110 from the game camera 115 are transferred to a digital memory device 125 that is connected to a digital processor 120. The digital processor contains software programs comprising a state machine 145 and an analysis engine 140 that access data in the memory device 125 and provide control and display information to a graphical user interface (GUI) 135. This configuration enables a user 130 to select images and image features, and to perform an analysis of stored images 150 of the animal of interest 110 to determine a score for the animal of interest 110.

The digital memory device stores the images 150, reference feature data 155, score templates 160, points and scores 165, accuracy estimates 170, evaluation rules 175 and help files 180. The reference feature data 155 is used by the analysis engine 140 as a standard calibration mechanism for each animal type to be analyzed. Multiple characteristics and statistical variations of the characteristics are maintained in the memory device 125 as feature data 155. The score templates 160 contain fields that used to store calculated values. The points and scores 165 of individual animal characteristics and an overall animal score include the results of the analysis performed by a user 130. The analysis engine 140 inserts calculated values into a copy of a scoring template 160 to produce a score output 165 to the user 130. Accuracy estimates 170 of the overall scoring are generated based on correlations between individual measurements. The measurements may be compared with known reference feature data statistics 155 for further evaluation of the analysis accuracy. The evaluation rules 175 are used to configure the state machine 145 to determine what a user 130 should measure and how the measurements should be treated. Some measurements may require multiple point selections and some measurements may be areas rather than lengths. Custom evaluation rules 175 enable a system to be used to evaluate many different types of animals and many different animal characteristics. Since each step in an evaluation may require specific instructions to correctly perform the desired measurement, help files 180 are provided to assist a user 130. The help files 180 may include an image example showing how to make a measurement. The state machine 145 can access the help files 180 that are specific for each step in the analysis.

The software in the processor 120 includes a state machine 145 and an analysis engine 140. The state machine 145 is configurable using different sets of evaluation rules 175 to lead a user 130 through the image analysis process. A user 130 can step backward in the process, as needed, to make corrections, and the state machine 145 will keep track of the steps made by the user 130. At some steps in the process, a user 130 can skip forward and the state machine 145 will cause default values to be automatically determined by the analysis engine 140. The analysis engine 140 computes values for various measurements and an overall score of an animal based on the evaluation rules 175 and reference feature data 155.

The GUI 135 is comprised of a display, keyboard and mouse. Considering, for example, FIG. 3. The screenshot comprises three panels 350, 385, 390 that can be resized by the user 130. A top panel 350 provides instructions 325 and an example image 345 for each step in the evaluation process. The top panel 350 provides buttons for the user to move forward 340 or backward 355 through the steps, buttons to zoom in 360 and zoom out 365 on images, a button for help 375, and a button to clear point selection 370. The area below the top panel 350 is divided into two panels 385, 390 to view two different images of the same animal. The user 130 can load different images into each panel. The use of two images permits better evaluation of an animal because some characteristics may be obscured in one view but visible in another. A front image and a side image can be used to measure different characteristics. The user 130 can use a mouse or touch pad to select specific points on an image to evaluate specific characteristics including the length of points on a deer antler. Each view has a separate scale calibration because the animal may be a different distance from the camera. Each view can be scrolled up/down and right/left to select the desired subset of the image. Each view can be independently zoomed in and zoomed out.

Figure 2:
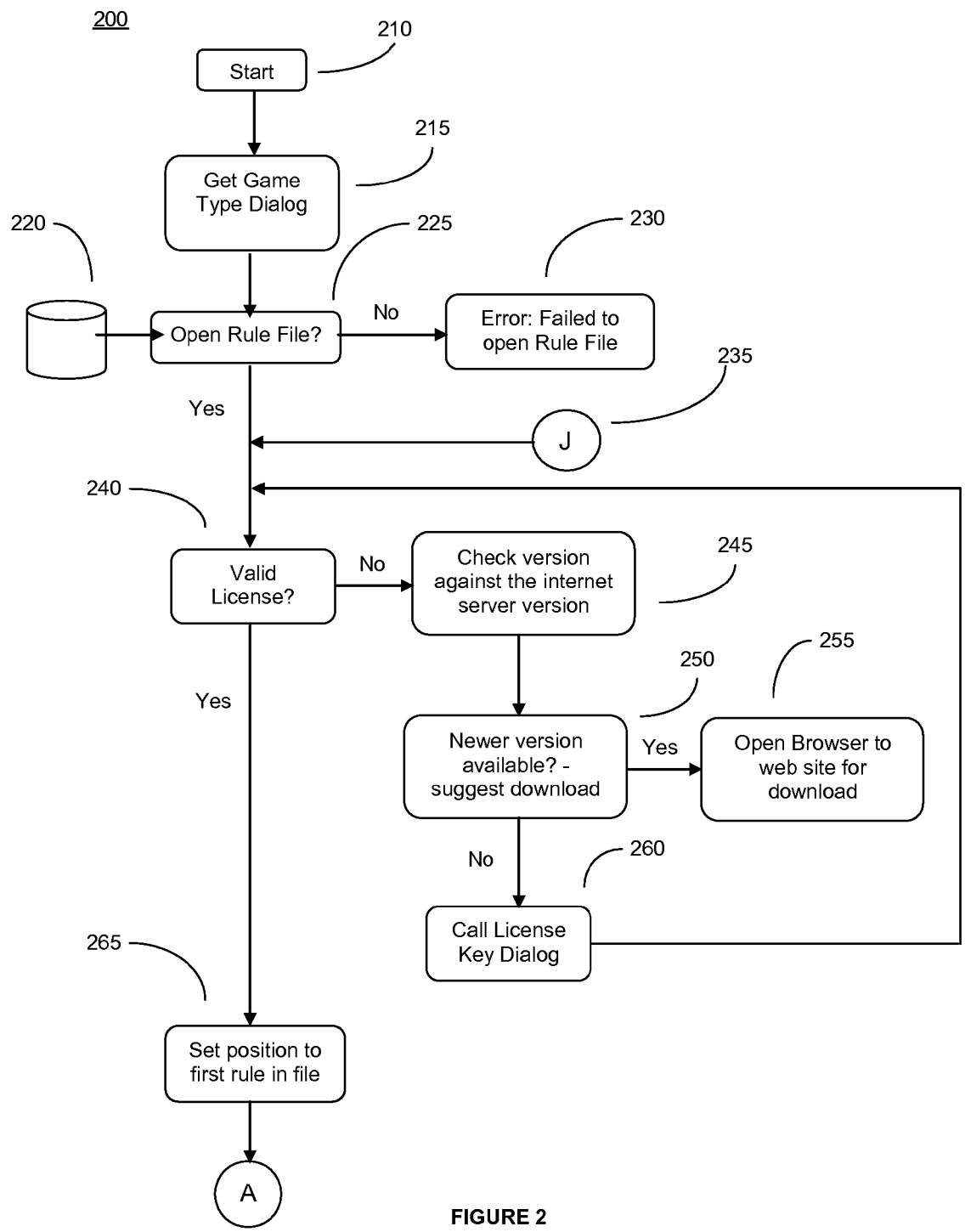
FIG. 2 depicts a flow diagram of steps required for initializing the system.
Figure 3:
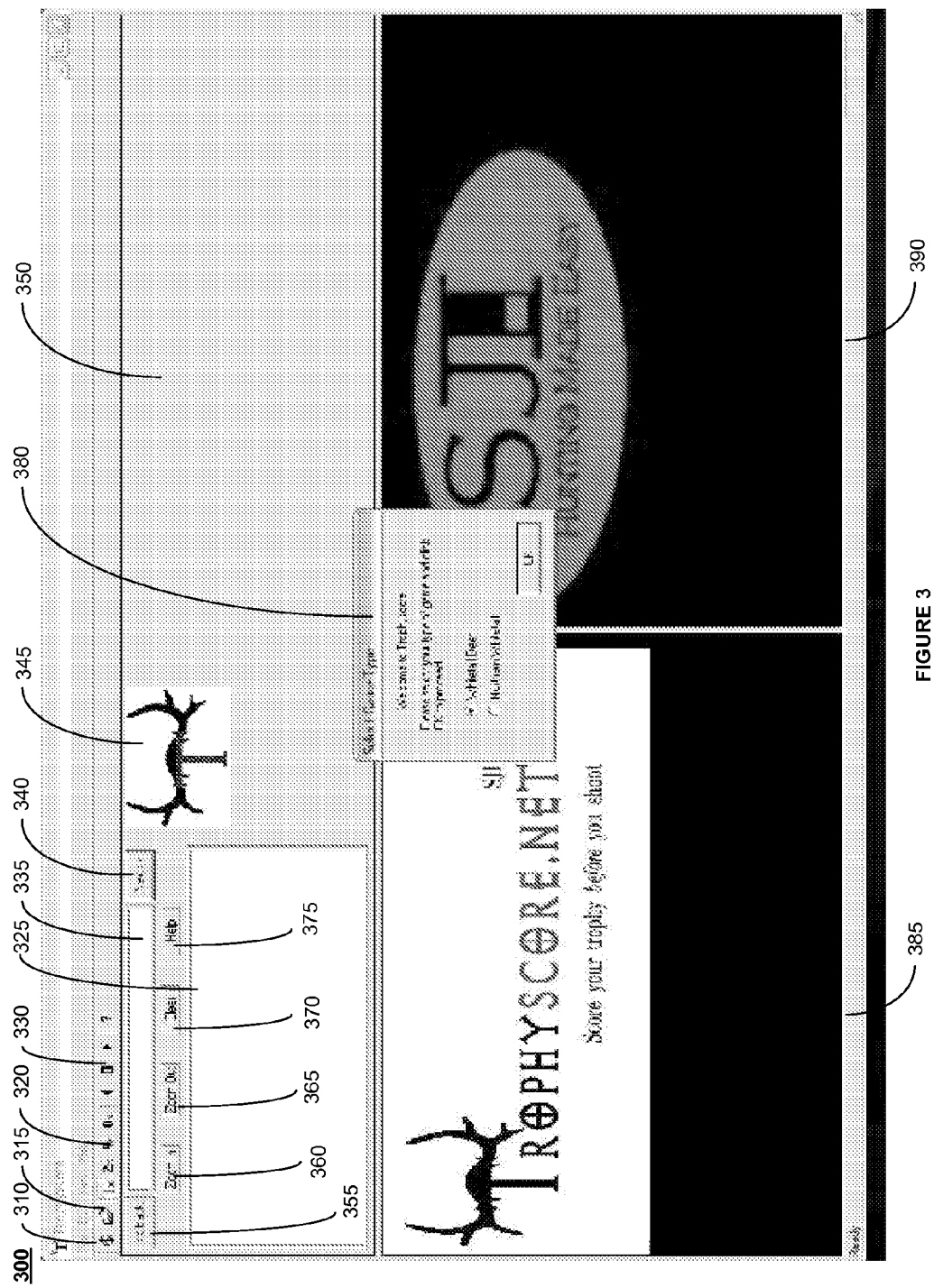
FIG. 3 shows an introduction screen shot when initializing the system.

Turning to FIG. 2 and FIG. 3, FIG. 2 depicts a flow diagram 200 of steps required for initializing the software system and FIG. 3 shows an introduction screen shot 300 when initializing the system. Once the system is started 210, a game type dialog is specified 215. The "Select Game Type" dialog box in FIG. 3 is used to specify the game type by selecting "Whitetail Deer" and "OK". There is a rule file per game type that defines the steps for analyzing an image. An evaluation rule file is then opened 225 by accessing the rule file from the digital storage device 220. If the program is unable to find or open the rule file 225, the application cannot proceed, an error condition 230 is generated and an error message dialog is displayed to the user. It is then determined if the user has a valid license 240, which is required for the program to continue. If the license is not valid 240, the version is checked to determine if a newer version is available 245. If a newer version is available, a dialog will recommend or insist that the user download an updated version from a server 250. If the user elects to download a newer version, a web browser is opened to the server and a newer version is downloaded 255. If the user does no elect to download a newer version, an opportunity is provided to the user to purchase a license key 260. If a new license key is purchased 260, the license is then validated 240. The state machine is the positioned at the first rule in the rule file 265.

Figure 6:
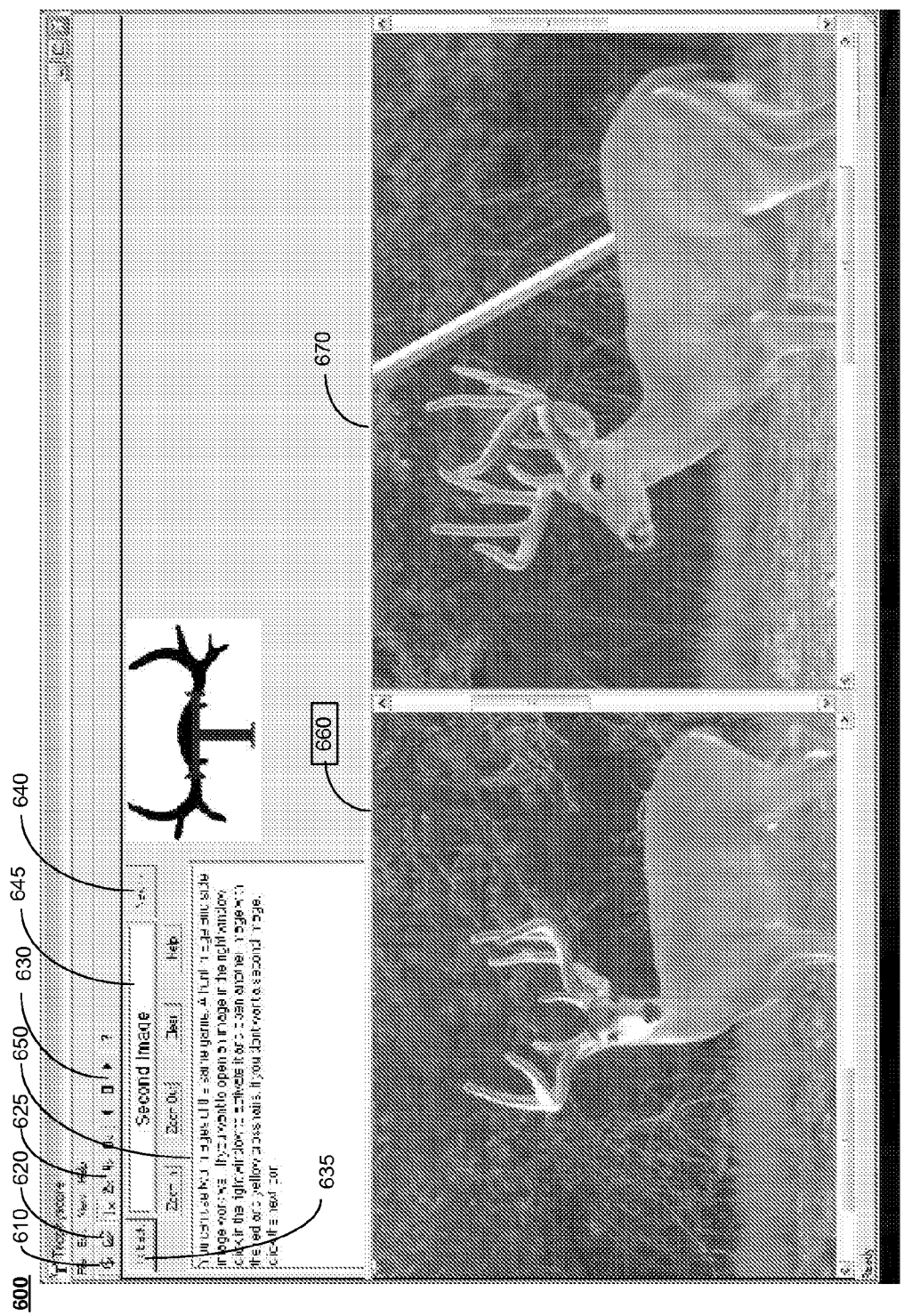
FIG. 6 shows a screen shot of left front and right side images of a selected animal.

Turning to FIG. 3, FIG. 3 shows an introduction screen shot 300 when initializing the system. The "Select Game Type" dialog box in FIG. 3 is used to specify the game type by selecting "Whitetail Deer" and "OK". There is a rule file per game type that defines the steps for analyzing an image. The screenshot 300 comprises three panels 350, 385, 390 that can be resized by the user 130. A top panel 350 provides instructions 325 and an example image 345 for each step in the evaluation process. The top panel 350 provides buttons for the user to move forward 340 or backward 355 through the steps, buttons to zoom in 360 and zoom out 365 on images, a button for help 375, and a button to clear point selection 370. The area below the top panel 350 is divided into two panels 385, 390 to view two different images of the same animal. The user can load different images into each panel. The use of two images permits better evaluation of an animal because some characteristics may be obscured in one view but visible in another. A front image and a side image can be used to measure different characteristics. The user can use a mouse or touch pad to select specific points on an image to evaluate specific characteristics including the length of points on a deer antler. Each view has a separate scale calibration because the animal may be a different distance from the camera. Each view can be scrolled up/down and right/left to select the desired subset of the image. Each view can be independently zoomed in and zoomed out. Images of a selected animal are shown in FIG. 6

By clicking on the target icon 310 in the upper left hand corner of the screenshot 300, "My Pictures" folder is selected where folders of animal images may be opened 315. The size of the images may be adjusted using magnification buttons 320. Forward and back arrows 330 enable a user to sequence through a list of images.

Figure 4:
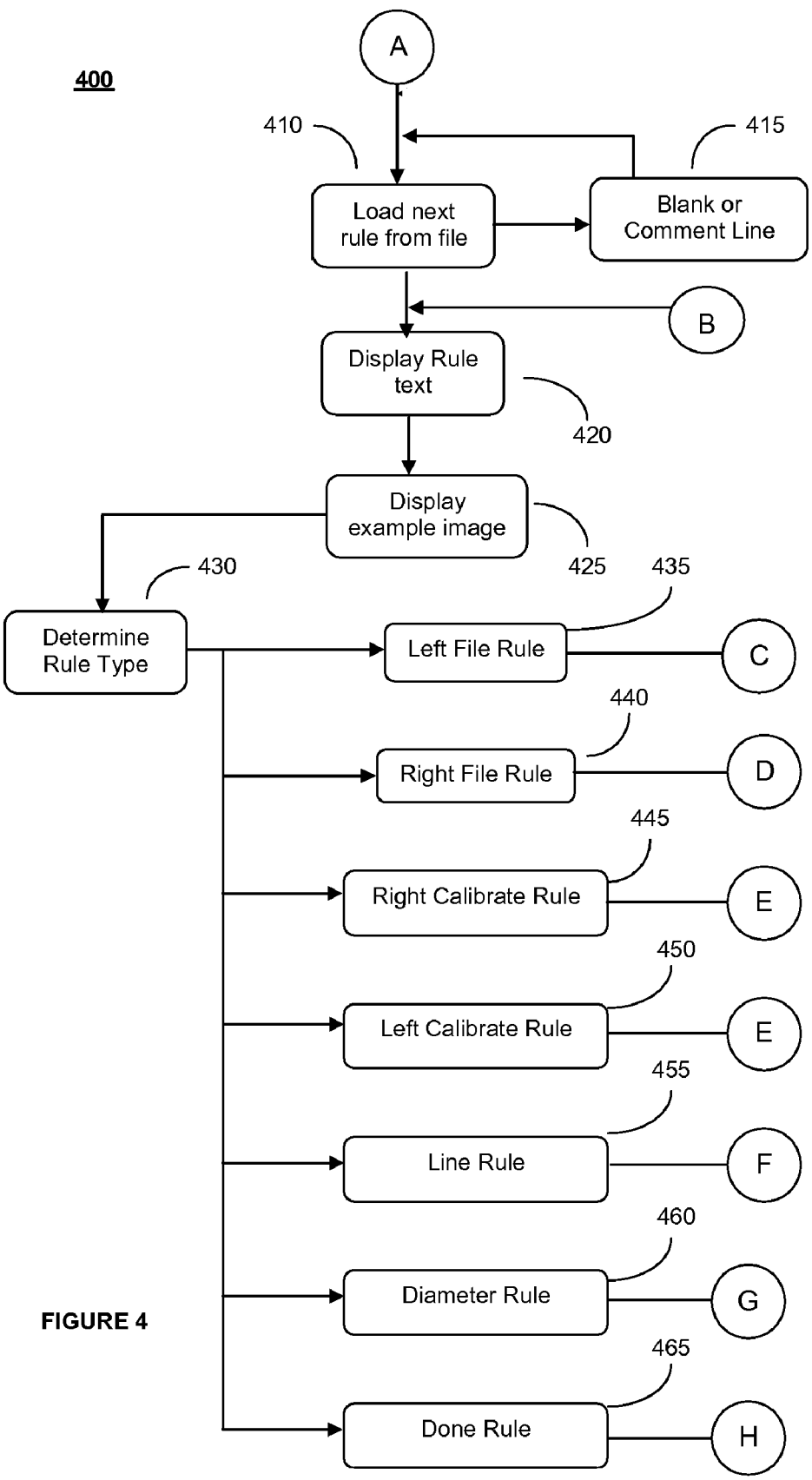
FIG. 4 depicts a flow diagram of the steps for rule selection, loading and display.

Turning to FIG. 4, FIG. 4 depicts a flow diagram 400 of the steps for rule selection, loading and display. The next rule file is then loaded 410. Any blank or comment lines are ignored 415 and the file pointer is moved to the next record. An explanatory text for the particular step is then displayed in the text window 420 (e.g., see 650 in FIG. 6). An image file name is read from the rule file and an example image is then copied from the file into the window 425 (e.g., see 1150 in FIG. 11). The rule type is then determined 430. There are a variety of rule types and more can be added. The rule type determines how the current step should be processed.

The program includes a rule interpreter that reads the rule that is specific for the type of animal. Each time the user selects the next button in the user interface, the rule interpreter reads the next rule from the rule file. Each time the user selects the back button in the user interface (e.g., 635 in FIG. 6), the rule interpreter returns to the previous rule. The rule file format includes the following fields: step name, step description, step type, example image, number of points required for the step, a flag indicating if the step can be skipped, and a field indication if the user is allowed to skip to the end. The step types include:

Load left file rule 435—allows the user to load an image into the left view.

Load right file rule 440—allows the user to load an image into the right view.

Calibrate the left image rule 450—The user must select the calibration points from the left image. For deer images, the diameter of the animal's eye is used to calibrate the size of the image.

Calibrate the right image rule 445—The user must select the calibration points from the right image.

Line rule 455—The user can select multiple points on a characteristic of the animal. The maximum number of points that can be selected is defined in the rule file. Two points is the minimum number of points that can be selected for a line.

Diameter rule 460—Some measurements require the circumference of a feature. The circumference of the deer antler is an example of this measurement. The diameter is measured and the circumference is calculated from the diameter.

Done rule 465—The point selection is complete and the score is tabulated when the user hits the next button.

None—This type of step is only to provide information to the user. No data is gathered at this step.

Figure 5A:
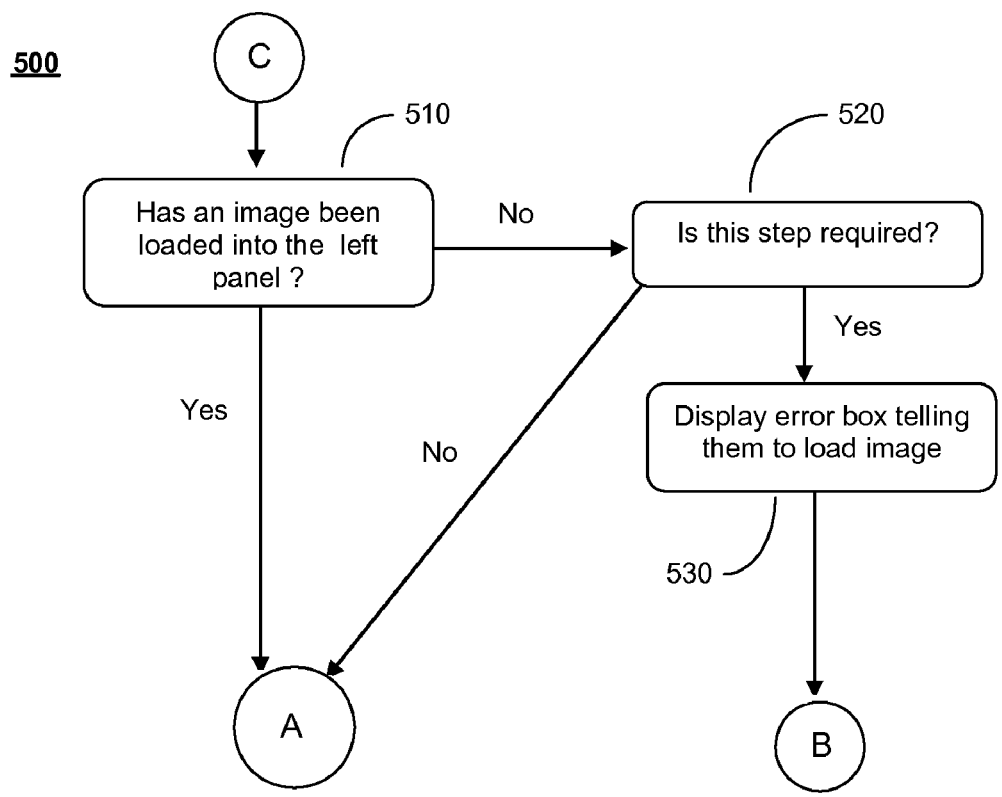
FIG. 5A and FIG. 5B depict flow diagrams for displaying left and right images of a selected animal using left and right file rules.
Figure 5B:
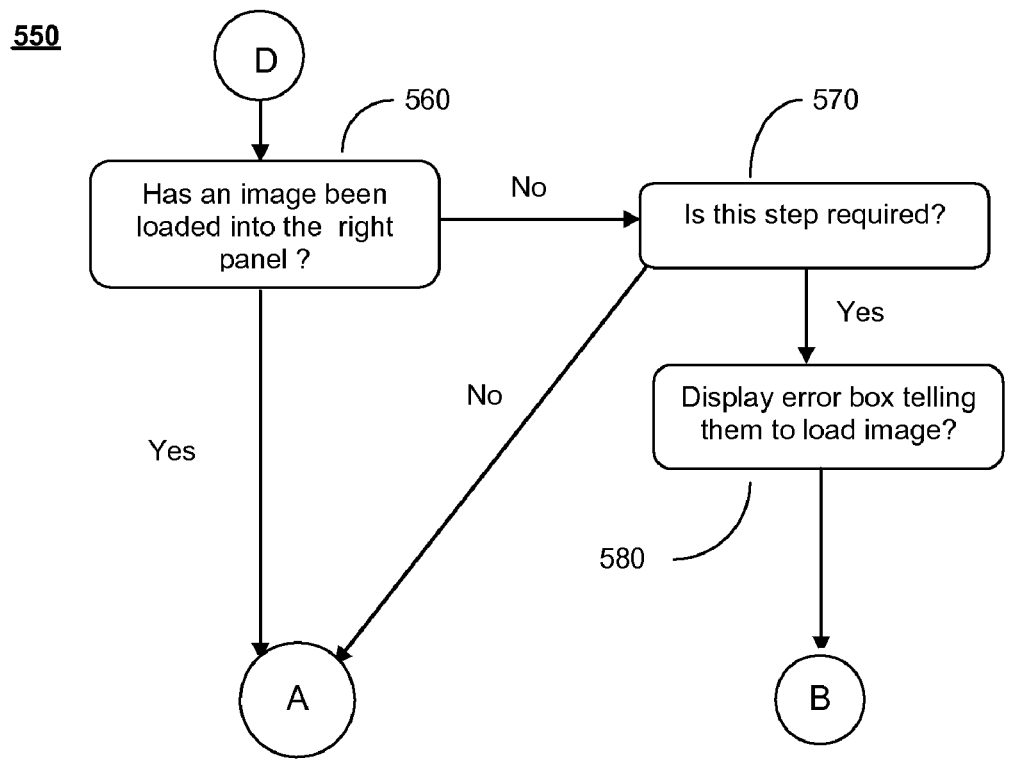

Turning to FIG. 5A, FIG. 5B and FIG. 6, FIG. 5A and FIG. 5B depict flow diagrams 500, 550 of the left and right file rules (435 and 440 in FIG. 4) for displaying left and right images of a selected animal in the left window 660 and the right window 670 of FIG. 6 using left and right file rules. FIG. 6 shows a screen shot 600 of left front and right side images of a selected animal. To open an image in the left window of FIG. 6, click the left window in FIG. 6 and click on the target icon 610 in the upper left hand corner of the screenshot 600, which opens the "My Pictures" folder where folders of animal images may be opened 620. The size of the images may be adjusted using magnification buttons 625. Forward and back arrows 630 enable a user to sequence through a list of images.

The left file rule flow 500 shown in FIG. 5A is intended to ensure that an image has been loaded into the left window 660. The left file rule (435 in FIG. 4) detects whether an image has been loaded 510 in the left window 660, or if this step is required 520. If an image has been loaded in the left window 660 and this step is required 520, and the user selects "Next" 640, the rule text 650 and the left image 660 are displayed, and the next rule file (in this case, the right rule file) is accessed. If this step is not required 520, the next rule file is accessed. If this step is required 520 and an image has not been loaded into the left window 660, an error dialogue is displayed instructing the user to load an image 530 in the left window 660 before proceeding.

When the left file rule has been completed, the right file rule flow shown in FIG. 5B is processed to ensure that an image has been loaded into the right window 670. The right file rule (440 in FIG. 4) detects whether an image has been loaded 560 in the right window 670, or if this step is required 570. If an image has been loaded in the right window 670 and this step is required 570, and the user selects "Next" 640, the rule text 650 and the right image 670 are displayed, and the next rule file (in this case, the right calibrate rule file) is accessed. If this step is not required 570, the next rule file (445 in FIG. 4) is accessed. If this step is required 570 and an image has not been loaded into the right window 670, an error dialogue is displayed instructing the user to load an image 580 in the right window 670 before proceeding.

Figure 7:
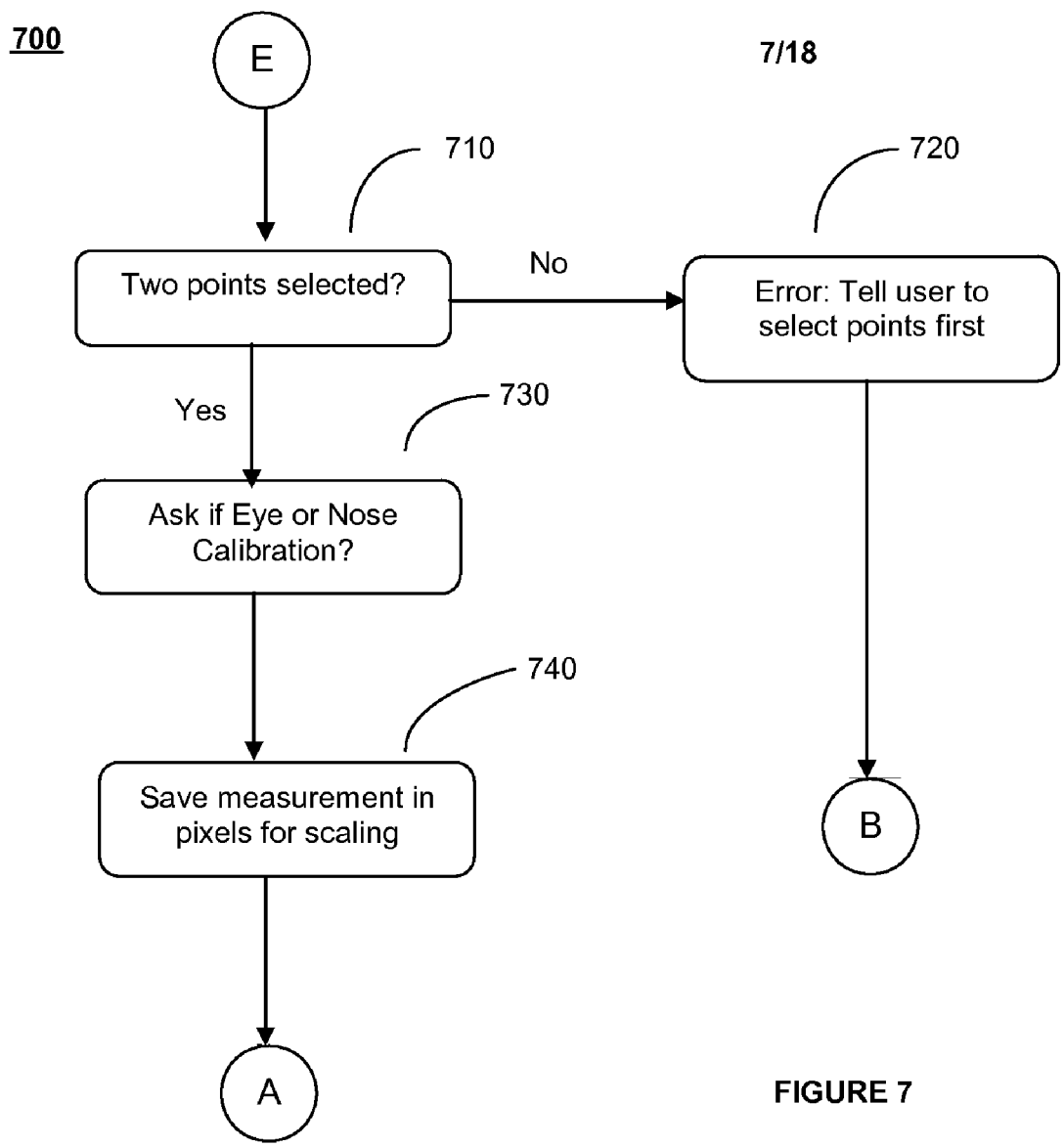
FIG. 7 depicts a flow diagram for left and right calibrate rules.
Figure 8:
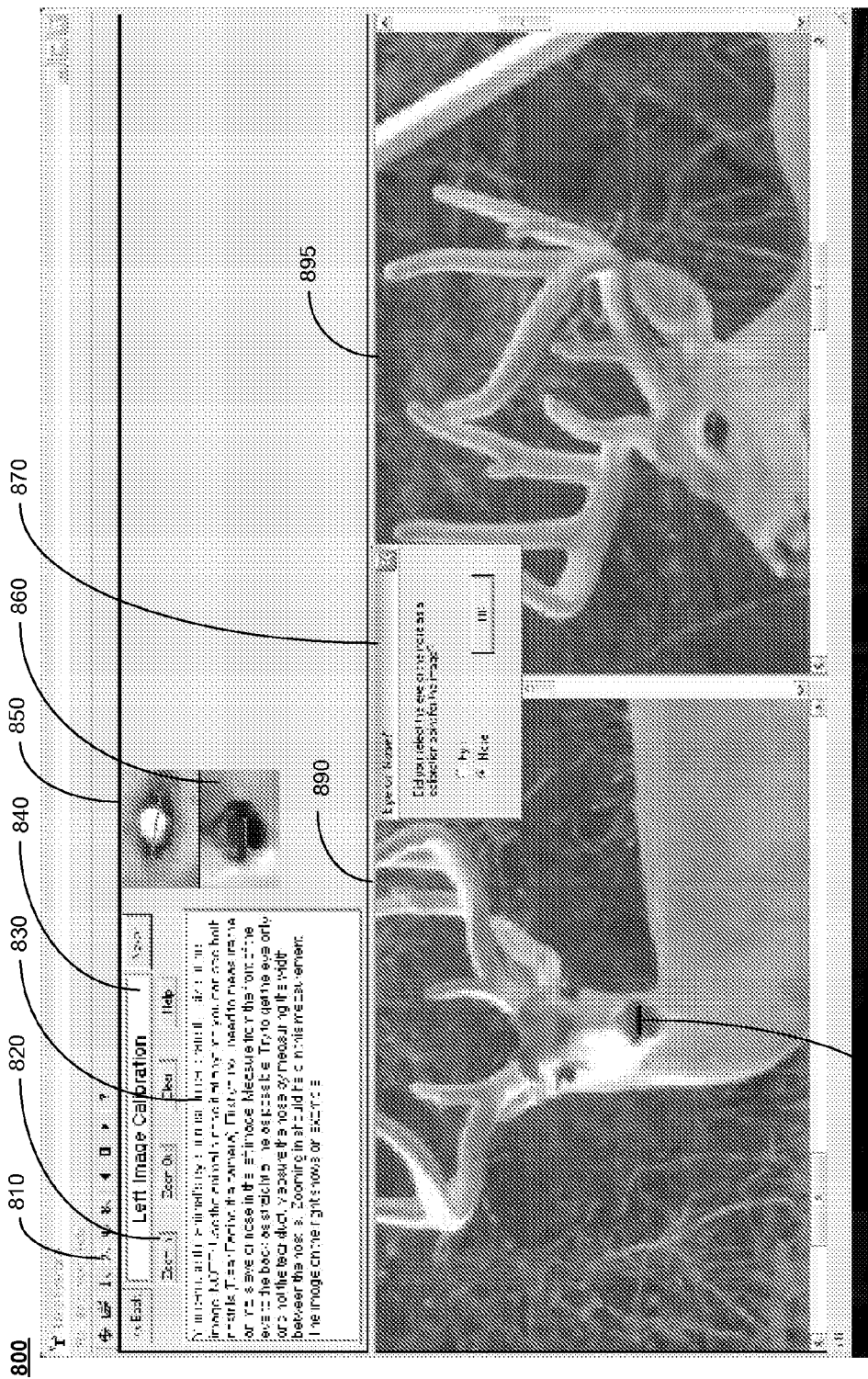
FIG. 8 shows a screen shot of left image calibration using the left calibrate rule.

To determine the size of an imaged animal, the right and left images must be calibrated. The diameter of the eye or the width of the nose is currently options for calibrating the image size. Turning to FIG. 7 and FIG. 8, FIG. 7 depicts a flow diagram 700 for left and right calibrate rules, and FIG. 8 shows a screen shot 800 of left image calibration using the left calibrate rule (see 450 in FIG. 4). The images shown in the left and right windows 890, 895 of FIG. 6 are the images selected in a previous step, where the user may zoom in and out 820 in order to get a better view of the nose of the selected animal. Instructions 830 and example images 850, 860 are shown in the top panel. The title window 840 designated the current rule file being processed.

Referring to FIG. 7 and FIG. 8 for calibrating an image using a nose measurement using the left calibrate rule (see 450 in FIG. 4), the user must select two points 710 that represent the width of the nose 880. If the user does not select two points for the nose measurement, an error dialogue is sent to the user 720 instructing the user to select two points. The user is then asked if this is a nose measurement or an eye measurement 730, and the user selects "Nose" and "OK" 870. The nose measurement in pixels is saved for scaling the images 740. The process then displays the next rule text for processing the right image rule shown in FIG. 7 and FIG. 9.

Figure 9:
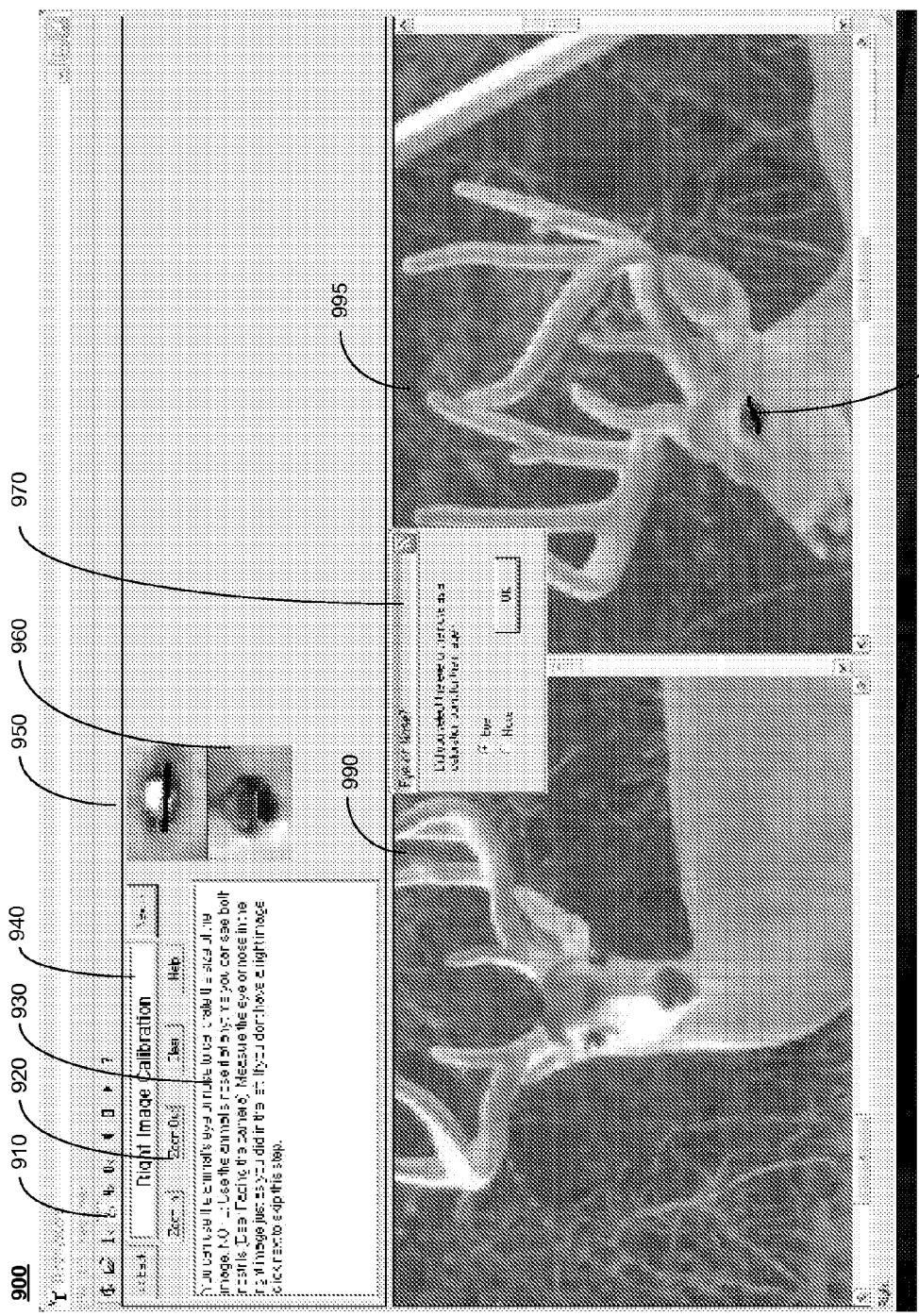
FIG. 9 shows a screen shot of right image calibration using the right calibrate rule.

Referring to FIG. 7 and FIG. 9 for calibrating an image using an eye measurement using the right calibrate rule (see 445 in FIG. 4), the user must select two points 710 that represent the width of an eye 980. If the user does not select two points for the eye measurement, an error dialogue is sent to the user 720 instructing the user to select two points. The user is then asked if this is a nose measurement or an eye measurement 730, and the user selects "Eye" and "OK" 870. The eye measurement in pixels is saved for scaling the images 740. The process then displays the next rule text for processing the line rule shown in the flow diagram of FIG. 10 and the screenshots of FIGS. 11-14.

Figure 10:
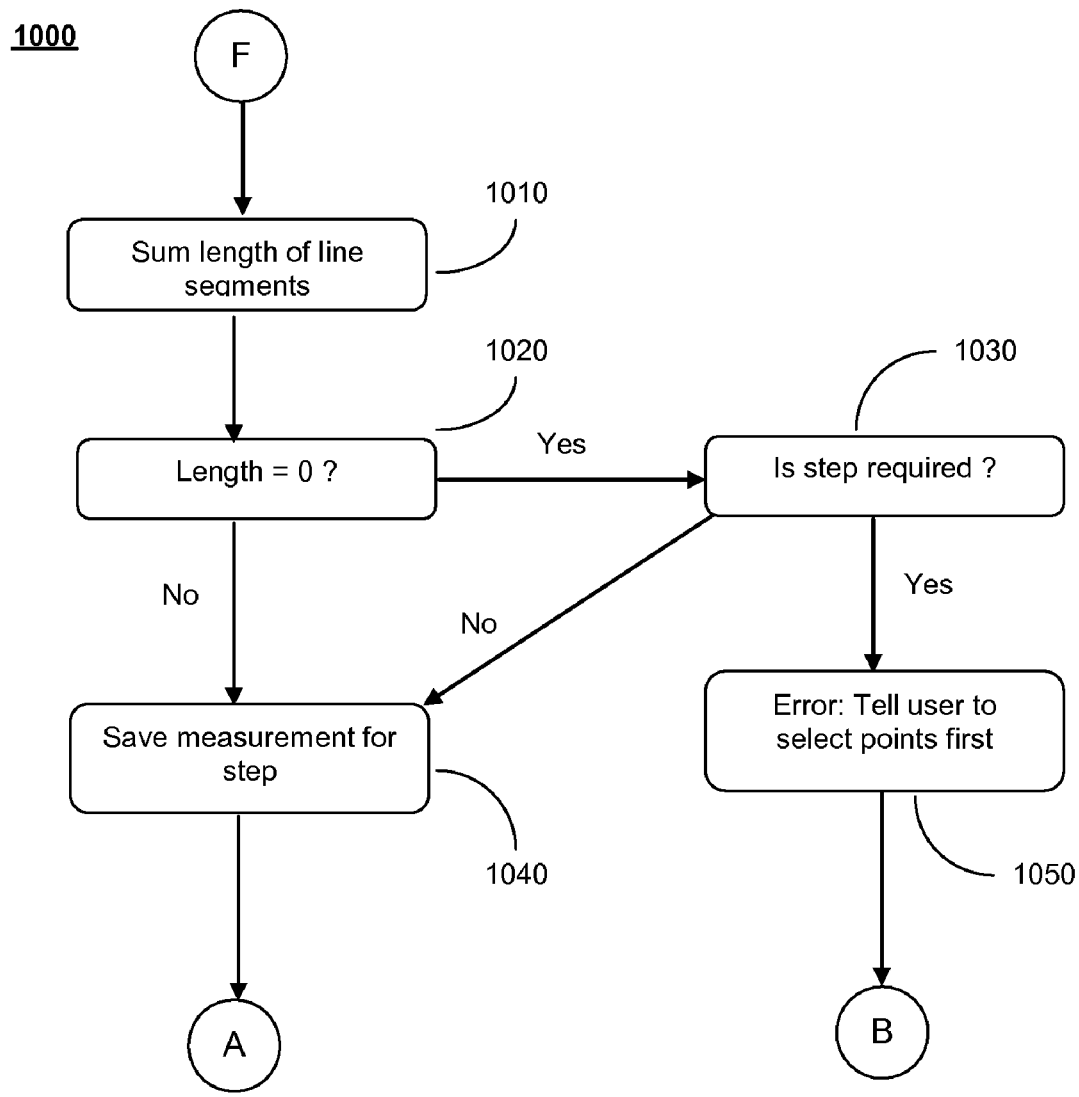
FIG. 10 depicts a flow diagram for the line rule.
Figure 11:
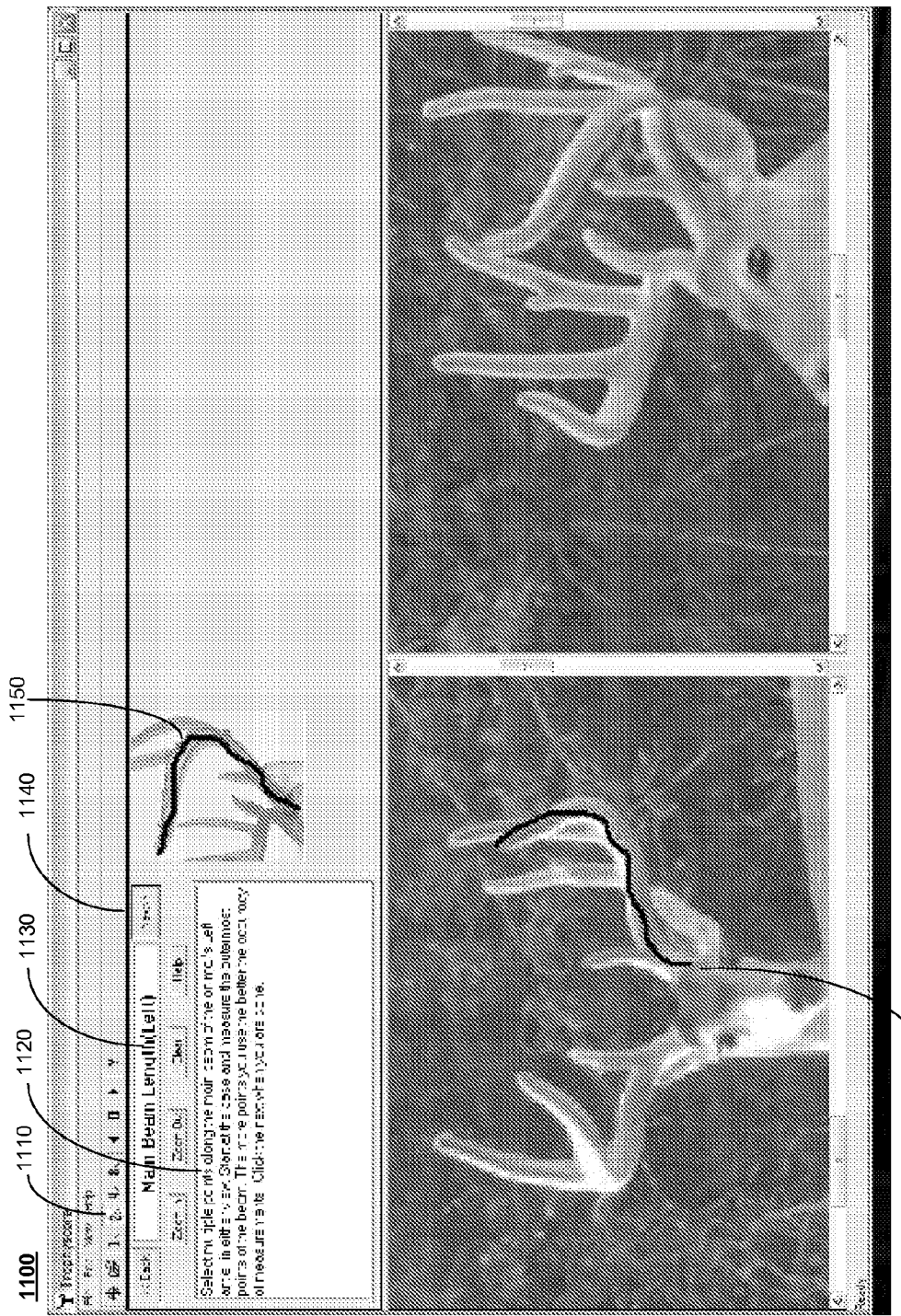
FIG. 11 shows a screen shot of a left front image for main beam length determination using the line rule.
Figure 12:
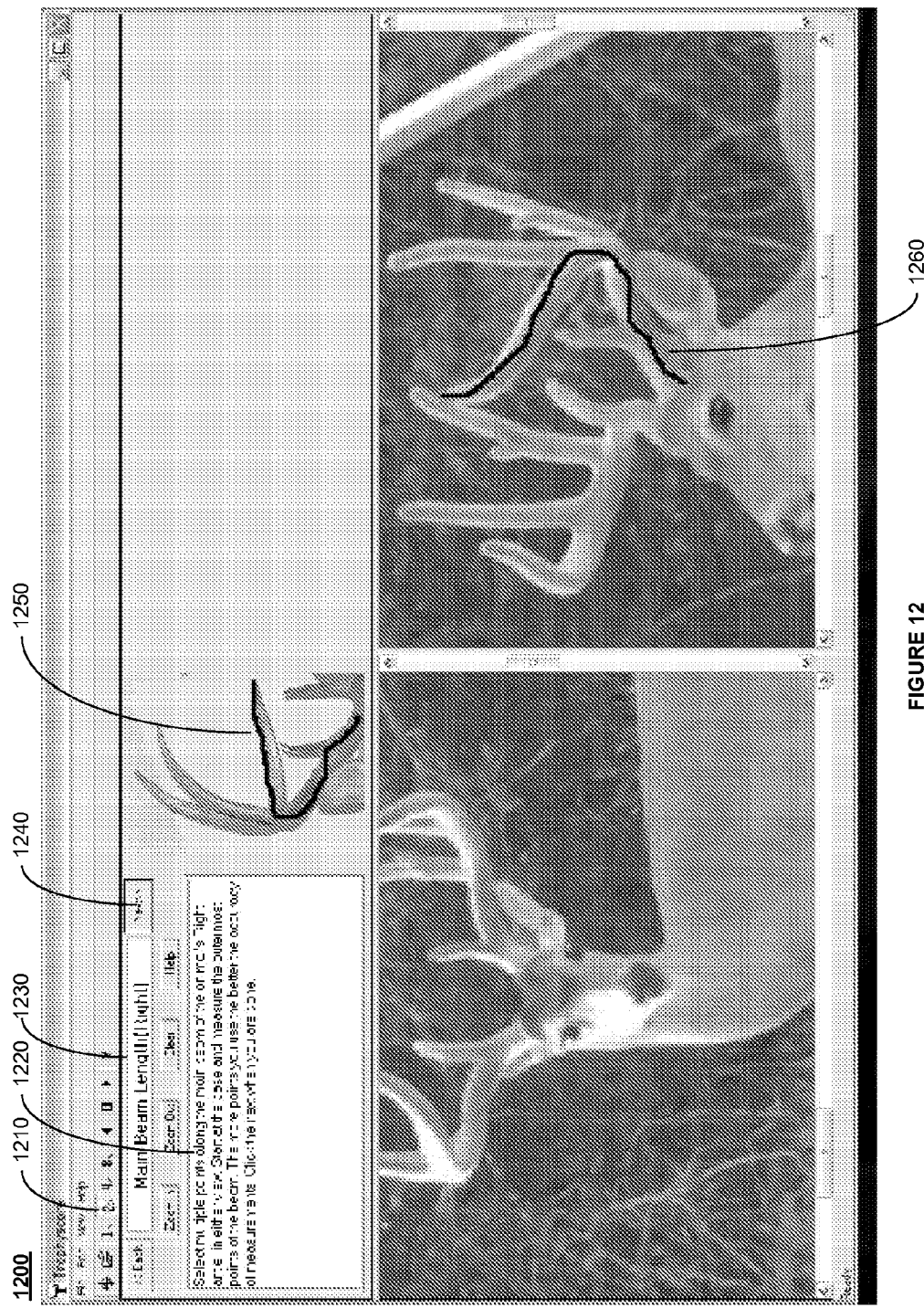
FIG. 12 shows a screen shot of a right side image for main beam length determination using the line rule.
Figure 13:
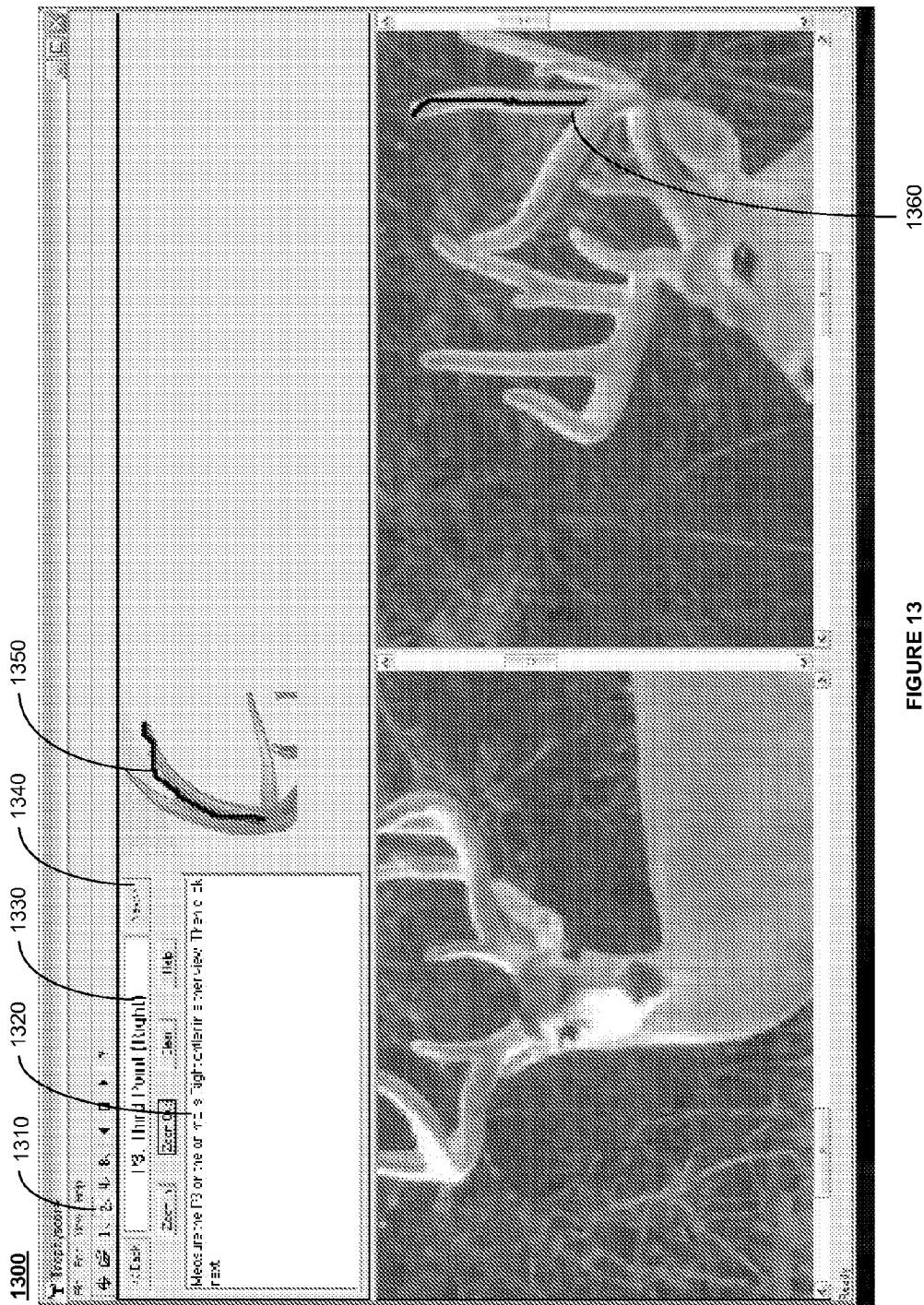
FIG. 13 shows a screen shot of a right side image for third point length determination using the line rule.
Figure 14:
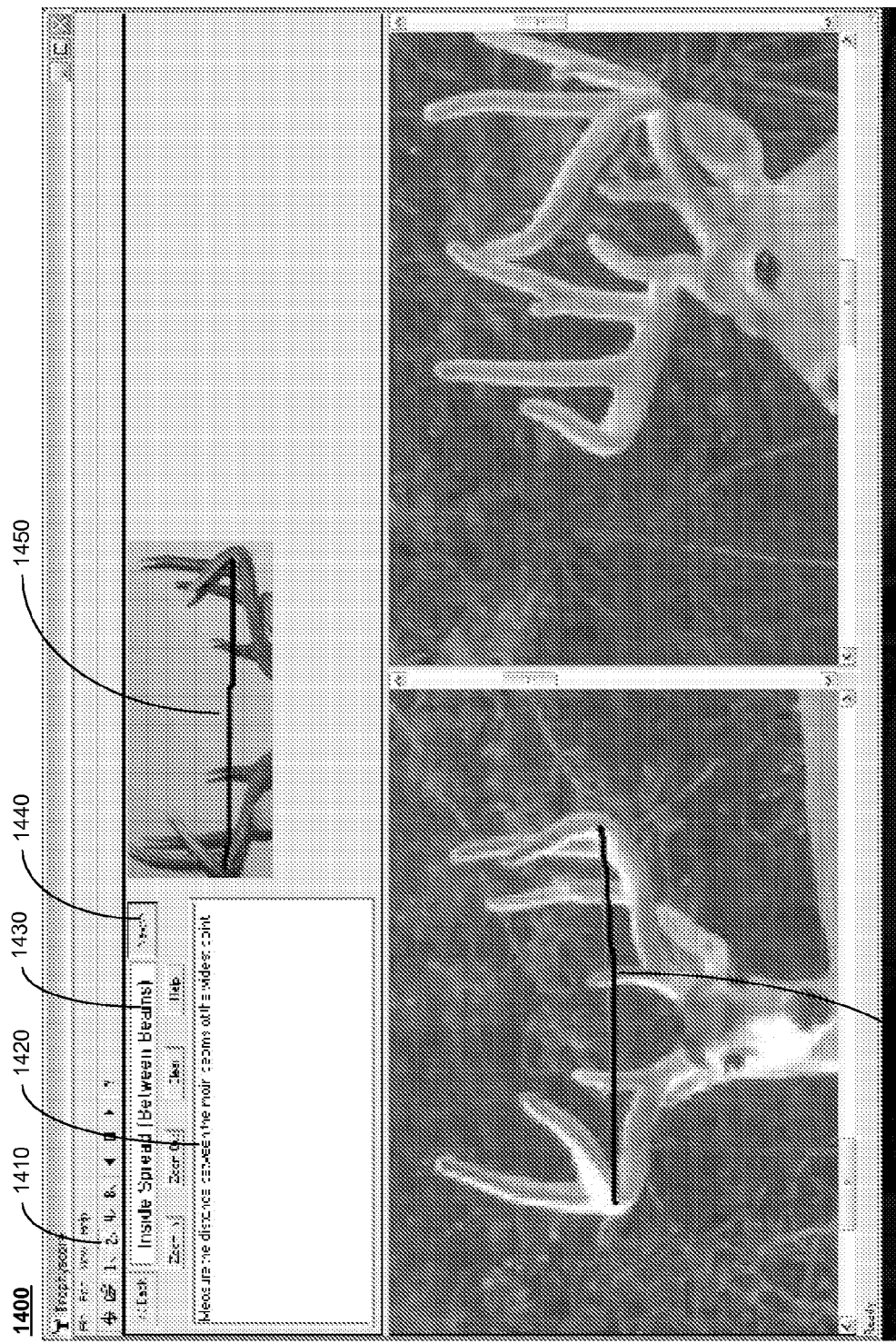
FIG. 14 shows a screen shot of a left front image for inside spread determination using the line rule.

Turning to FIG. 10, FIG. 10 depicts a flow diagram for the line rule that is used to measure antler beam length left and right shown in FIG. 11 and FIG. 12, third antler point shown in FIG. 13, and antler inside spread shown in FIG. 14.

Considering FIG. 10 and FIG. 11 for measuring antler beam length left 1130 using the instructions 1120 and sample image 1150. A user adjusts the image magnification 1210 and traces the cursor along the length of the left antler beam 1160, while the process sums the lengths of the segments 1010. If the beam length is zero 1020 and the step is not required 1030, the process sequences on to the next image measurement 1040. If the beam length is zero 1020 and the step is required 1030, an error dialogue is sent to the user instructing the user to make the appropriate measurements 1050. If a non-zero beam length 1020 is required and measured 1010, the measurement is saved 1040 and the process sequences to the next measurement when the user clicks the "Next" button 1140.

Considering FIG. 10 and FIG. 12 for measuring antler beam length right 1230 using the instructions 1220 and sample image 1250. A user adjusts the image magnification 1210 and traces the cursor along the length of the right antler beam 1260, while the process sums the lengths of the segments 1010. If the beam length is zero 1020 and the step is not required 1030, the process sequences on to the next image measurement 1040. If the beam length is zero 1020 and the step is required 1030, an error dialogue is sent to the user instructing the user to make the appropriate measurements 1050. If a non-zero beam length 1020 is required and measured 1010, the measurement is saved 1040 and the process sequences to the next measurement when the user clicks the "Next" button 1240.

Considering FIG. 10 and FIG. 13 for measuring antler third point 1330 using the instructions 1320 and sample image 1350. A user adjusts the image magnification 1310 and traces the cursor along the length of the antler third point 1360, while the process sums the lengths of the segments 1010. If the third point length is zero 1020 and the step is not required 1030, the process sequences on to the next image measurement 1040. If the beam length is zero 1020 and the step is required 1030, an error dialogue is sent to the user instructing the user to make the appropriate measurements 1050. If a non-zero beam length 1020 is required and measured 1010, the measurement is saved 1040 and the process sequences to the next measurement when the user clicks the "Next" button 1340.

Considering FIG. 10 and FIG. 14 for measuring antler inside spread 1430 using the instructions 1420 and sample image 1450. A user adjusts the image magnification 1410 and traces the cursor along the spread between the antler beams 1460, while the process sums the lengths of the segments

1010. If the spread is zero 1020 and the step is not required 1030, the process sequences on to the next image measurement 1040. If the spread is zero 1020 and the step is required 1030, an error dialogue is sent to the user instructing the user to make the appropriate measurements 1050. If a non-zero spread 1020 is required and measured 1010, the measurement is saved 1040 and the process sequences to the next measurement when the user clicks the "Next" button 1440.

Figure 15:
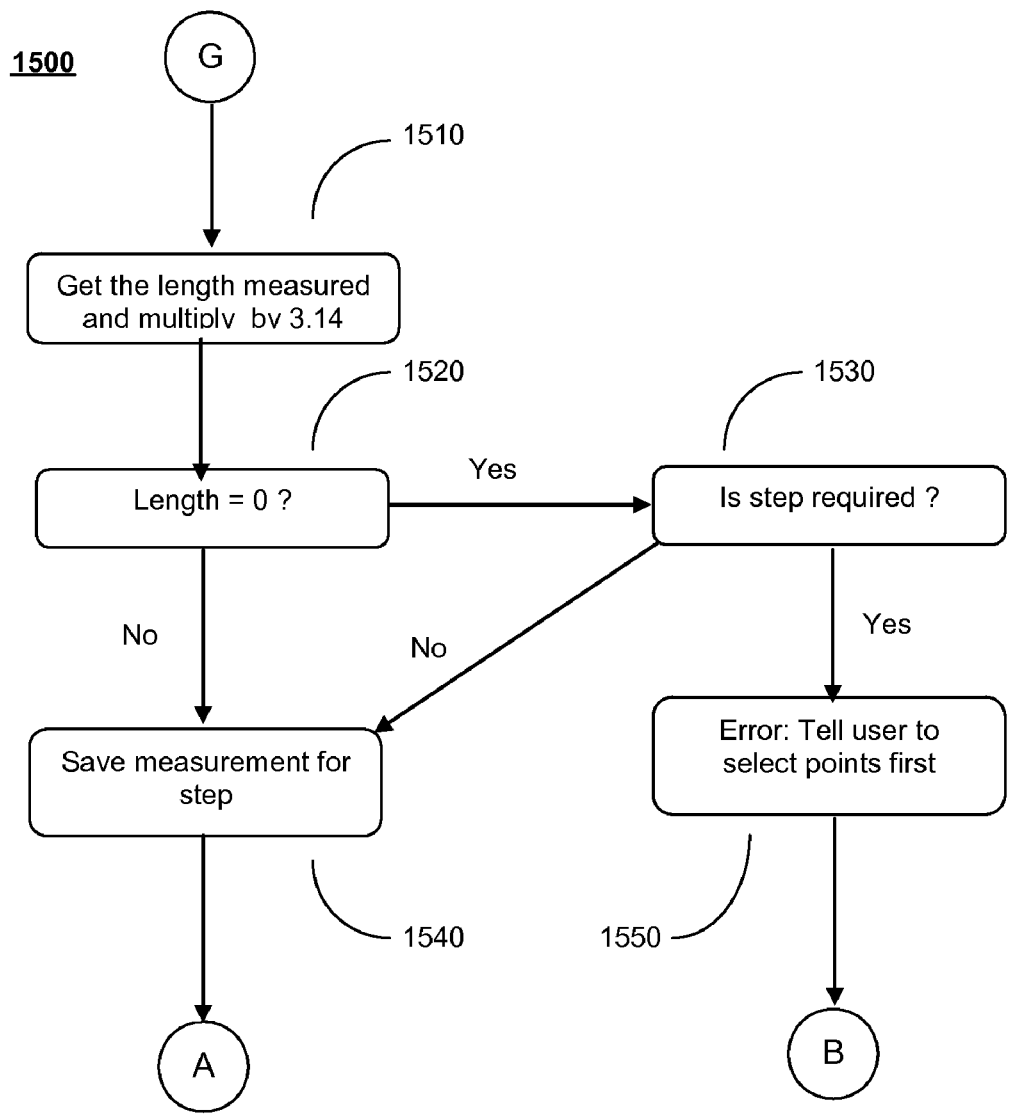
FIG. 15 depicts a flow diagram for the diameter rule for determining antler circumference.
Figure 16:
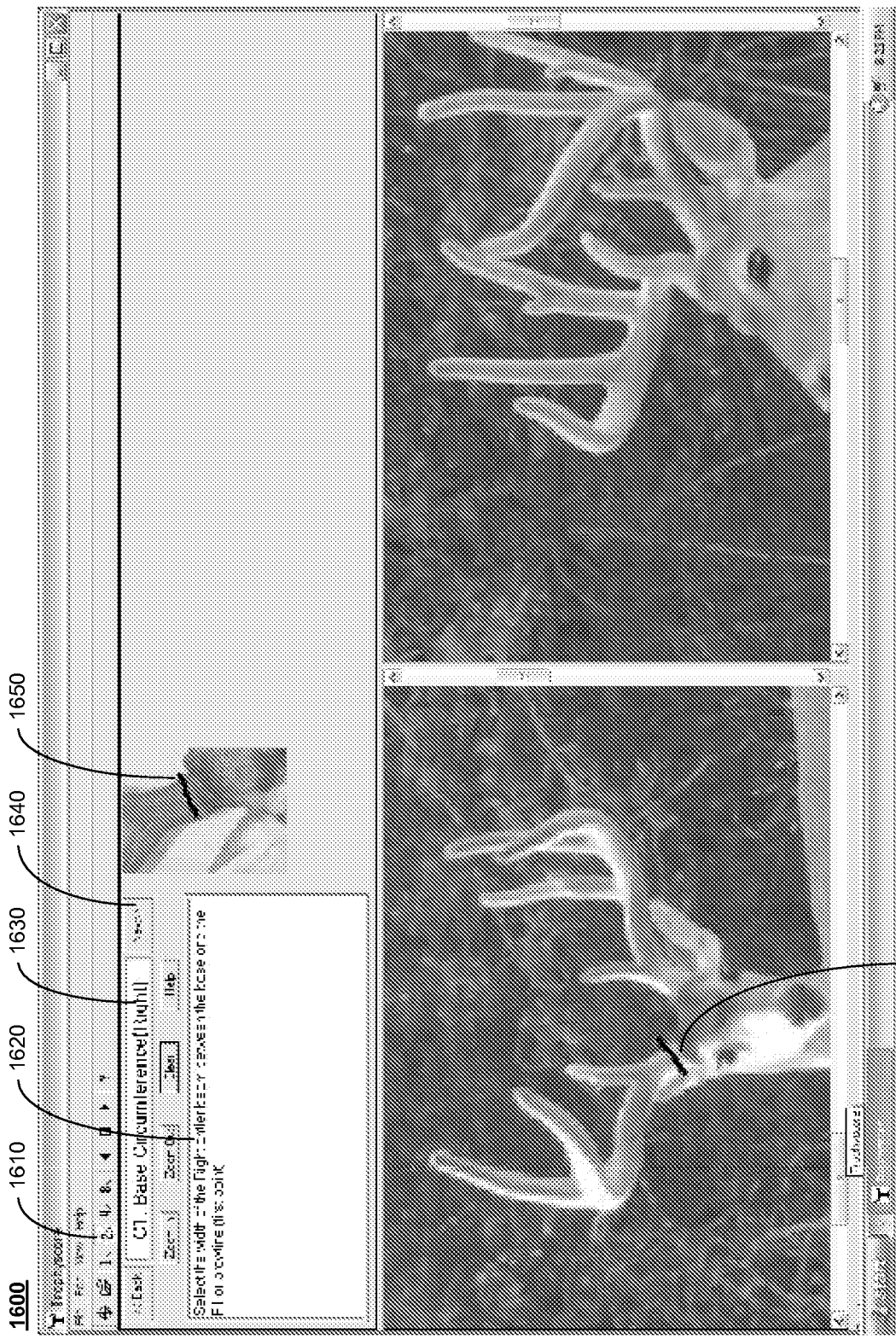
FIG. 16 shows a screen shot of a left front image for antler circumference determination using the diameter rule.

Turning to FIG. 15 and FIG. 16, FIG. 15 depicts a flow diagram 1500 of the diameter rule for determining antler circumference, and FIG. 16 shows a screen shot 1600 of a left front image for antler base circumference 1630 determination using the diameter rule 1500, the instructions 1620 and the example image 1650. A user adjusts the image magnification 1610 and traces the cursor along the length of the antler circumference image 1660, while the process sums the length of the circumference 1660. The measured circumference length 1660 is then multiplied by the quantity "3.14" to determine a calculated circumference. If the calculated circumference length 1510 is zero 1520 and the step is not required 1530, the process sequences on to the next image measurement 1540. If the calculated circumference 1510 is zero 1520 and the step is required 1530, an error dialogue is sent to the user instructing the user to make the appropriate measurements 1660. If a non-zero spread 1520 is required and calculated 1510, the measurement is saved 1540 and the process sequences to the next measurement when the user clicks the "Next" button 1640.

Figure 17:
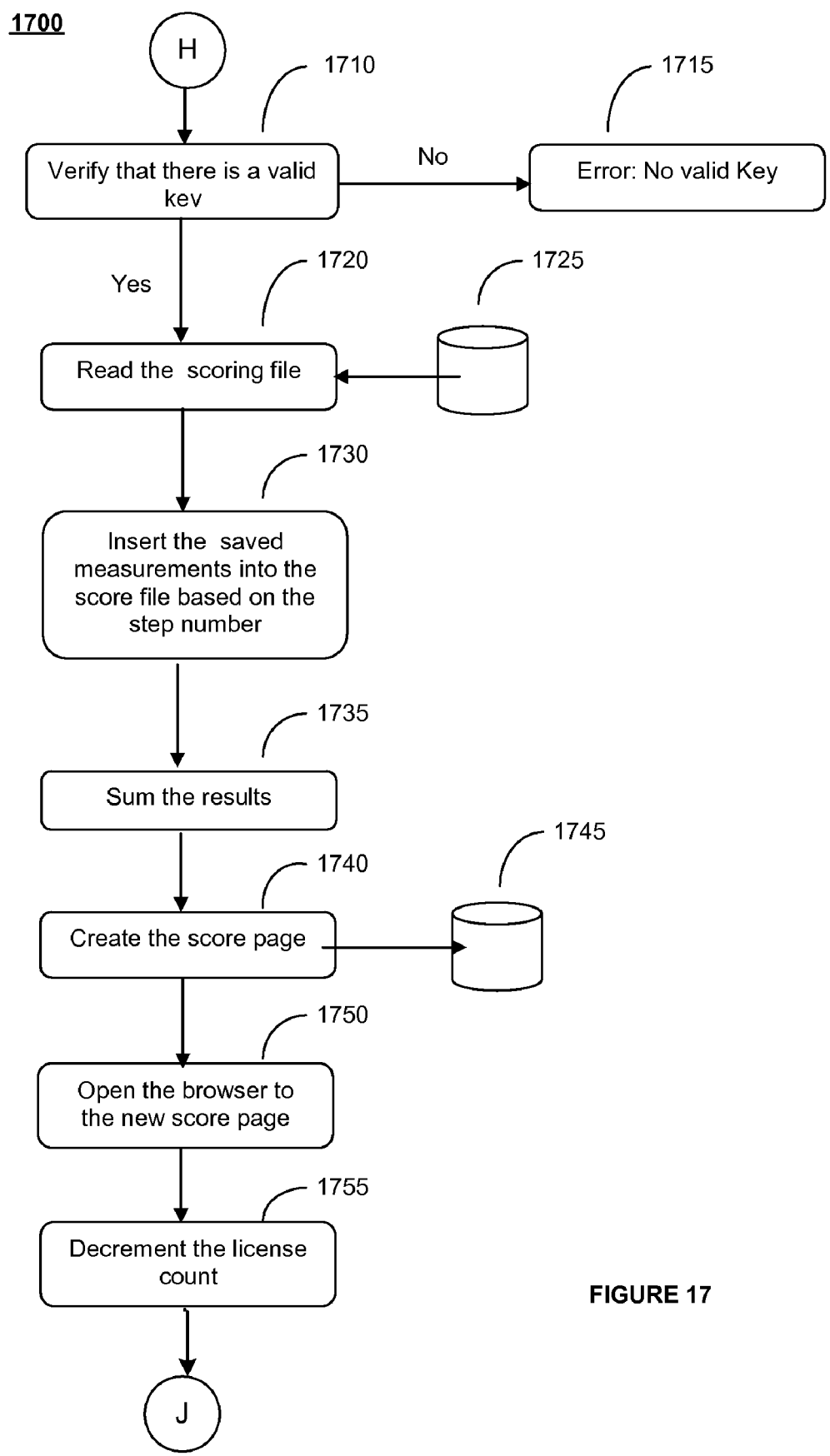
FIG. 17 depicts a flow diagram for the done rule for displaying measurements, point summary and final score.
Figure 18:
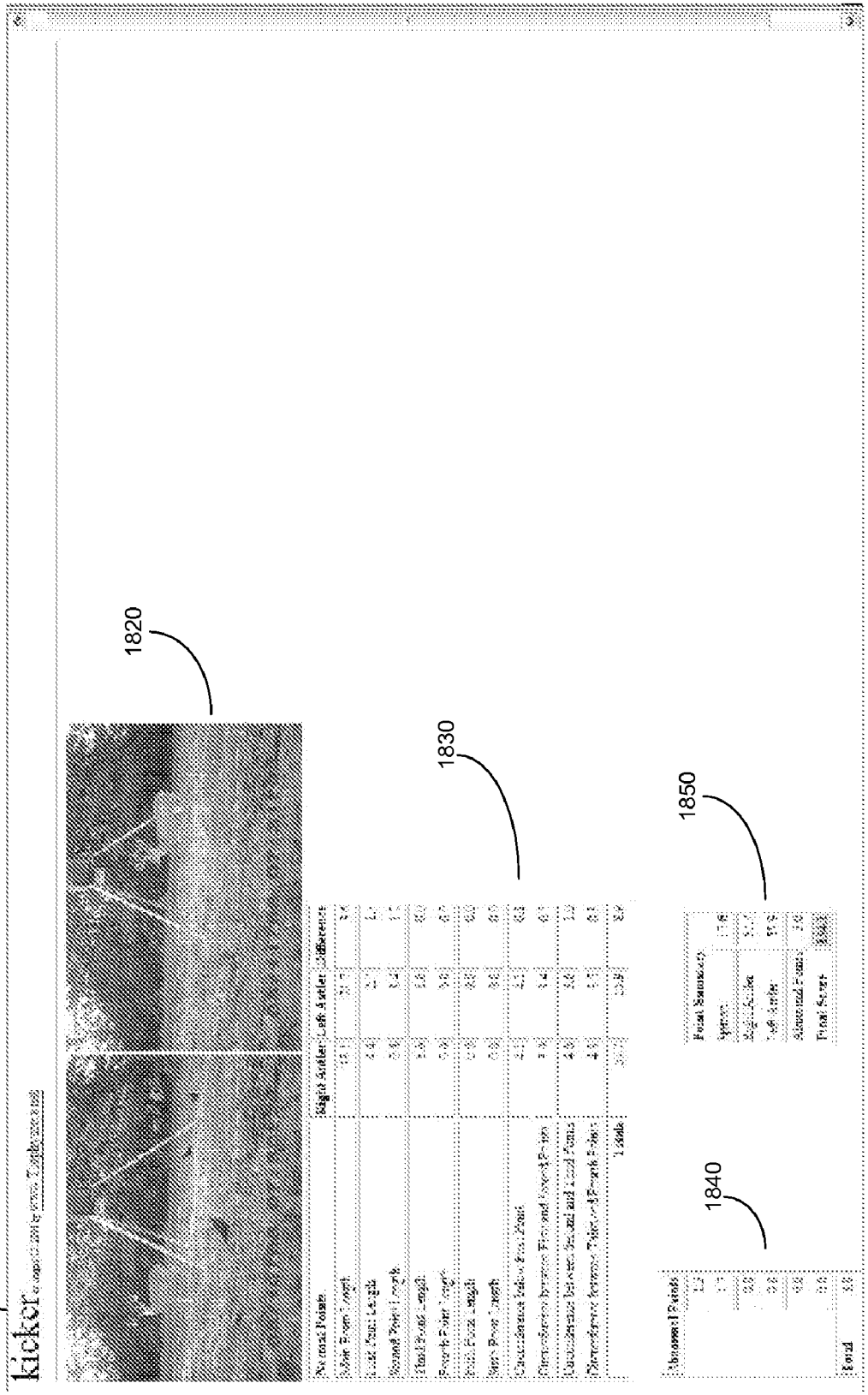
FIG. 18 shows a screen shot displaying measurements, point summary and final score.

Turning to FIG. 17 and FIG. 18, FIG. 17 depicts a flow diagram 1700 for the done rule for displaying measurements, point summary and final score, and FIG. 18 shows a screen shot 1800 displaying measurements, point summary and final score. The system verifies that there is a valid key 1710, and generates an error condition and displays a message when there is no valid key 1715. If there is a valid key, the scoring file is read 1720 from memory 1725. The saved measurements from the rule files are inserted into a score file based on the step number 1730. The scoring information and format is controlled by an unpopulated HTML file and fields in the HTML file are filled in by the scoring process. Values are inserted into the fields in the HTML file that are denoted by a number that corresponds to one of the steps defined in the rule file. The individual results values are then summed 1735 and an HTML score page is created 1740 and stored 1745. The score page 1800 includes a name for a selected animal 1810, picture of the selected animal 1820, individual characteristics scores 1830, abnormal point scores 1840, and a point summary based on all scores 1850. A web browser is used to open the score page 1800 to display the results 1750, and the license count is decremented 1755.

The final score of the evaluation 1850 is displayed in a web browser using HTML. The HTML output is generated from an HTML-like template file. The template includes delimited fields that are replaced when the score is calculated. The delimited fields have numbers that correspond to the rule step where the raw data was captured. This approach allows the output results to be customized to match the rule steps. The user provided images of the animal are linked into the HTML view of the score.

The scores from the previous evaluations are stored in separate folders with the images of the animals. When the user selects an icon on the toolbar, the scores folders are shown with the images of the animals for each selection. The Names of each animal are shown below the folder.

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method for determining physical characteristics of an unrestrained animal and displaying the characteristics to a user on a graphical user interface, comprising the steps of:
   receiving one or more captured digital images of an unrestrained animal and storing the one or more images in a digital memory device;
   processing at least one digital image of the unrestrained animal in a digital processor and displaying the at least one digital image on a graphical user interface;
   receiving a designation of the type of unrestrained animal in the at least one digital image;
   calibrating the animal size in the at least one digital image by accepting measurements based on user input of known size indicia for the designated animal type in the at least one image;
   determining measurements based on user input of the unrestrained animal in the at least one digital image for determining physical characteristics of the unrestrained animal;
   adjusting the measurements of the unrestrained animal based on the calibrated animal size; and
   displaying the at least one digital image, adjusted measurements, computed measurements, a measurement summary, and estimated measurement errors on the graphical user interface.

2. The method according to claim 1, wherein the step of receiving captured digital images further comprises receiving captured digital images from a digital game camera.

3. The method according to claim 1, wherein the steps of processing, receiving a designation, calibrating, determining measurements, adjusting and displaying are controlled by a state machine in a digital processor and execution within each step is controlled by an analysis engine in the digital processor.

4. The method according to claim 1, wherein the designated type of unrestrained animal is selected from the group consisting of exotic species and horned species.

5. The method according to claim 1, wherein the designated type of unrestrained animal is selected from the group consisting of northern whitetail deer, southern whitetail deer, mule deer, moose, caribou, elk, black bear, brown bear, goat and sheep.

6. The method according to claim 1, wherein the known size indicia is selected from the group consisting of nostril width and eye width.

7. The method according to claim 1, wherein the step of determining measurements comprises determining piecewise linear measurements and circumferential measurements.

8. The method according to claim 1, wherein the step of determining measurements is selected from the group consisting of determining antler main beam length, determining antler point length, determining antler spread, and determining antler base circumference.

9. The method according to claim 1, wherein the at least one digital image has different calibrating known size indicia.

10. The method according to claim 1, wherein scoring metrics are used for determining physical characteristics of unrestrained animals.

11. The method of claim 1, wherein the at least one digital image comprises at least two digital images for increased accuracy.

12. A computer-readable medium containing instructions implementing the method recited in claim 1 for controlling the computer system for determining physical characteristics of an unrestrained animal.

13. A system for determining physical characteristics of an unrestrained animal and displaying the characteristics to a user on a graphical user interface, comprising:
- means for receiving one or more captured digital images of an unrestrained animal and storing the one or more images in a digital memory device;
- means for processing at least one digital image of the unrestrained animal in a digital processor and displaying the at least one digital image on a graphical user interface;
- means for receiving a designation of the type of unrestrained animal in the at least one digital image;
- means for calibrating the animal size in the at least one digital image by accepting measurements based on user input of known size indicia for the designated animal type in the at least one digital image;
- means for determining measurements based on user input of the unrestrained animal in the at least one digital image for determining physical characteristics of the unrestrained animal;
- means for adjusting the measurements of the unrestrained animal based on the calibrated animal size; and
- the graphical user interface for displaying the at least one digital image, adjusted measurements, computed measurements, a measurement summary, and estimated measurement errors on the graphical user interface.

14. The system according to claim 13, wherein the means for receiving captured digital images further comprises means for receiving captured digital images from a digital game camera.

15. The system according to claim 13, wherein the means for processing, receiving a designation, calibrating, determining measurements, adjusting and displaying are controlled by a state machine in a digital processor and execution within each step is controlled by an analysis engine in the digital processor.

16. The system according to claim 13, wherein the designated type of unrestrained animal is selected from the group consisting of exotic species and horned species.

17. The system according to claim 13, wherein the designated type of unrestrained animal is selected from the group consisting of northern whitetail deer, southern whitetail deer, mule deer, moose, caribou, elk, black bear, brown bear, goat and sheep.

18. The system according to claim 13, wherein the known size indicia is selected from the group consisting of nostril width and eye width.

19. The system according to claim 13, wherein the means for determining measurements comprises determining piecewise linear measurements and circumferential measurements.

20. The system according to claim 13, wherein the means for determining measurements is selected from the group consisting of means for determining antler main beam length, means for determining antler point length, means for determining antler spread, and means for determining antler base circumference.

21. The system according to claim 13, wherein the at least one digital image has different calibrating known size indicia.

22. The system according to claim 13, wherein scoring metrics are used for determining physical characteristics of unrestrained animals.

23. The system according to claim 13, wherein the at least one digital image comprises at least two digital images for greater accuracy.

24. A computer readable medium containing instructions on a computer system for determining physical characteristics of an unrestrained animal and displaying the characteristics to a user on a graphical user interface by:
- receiving and processing at least one digital image of the unrestrained animal in a digital processor and displaying the at least one digital image on a graphical user interface;
- receiving a designation of the type of unrestrained animal in the at least one digital image and calibrating the animal size based on user input of known size indicia for the designated animal type in the at least one digital image;
- determining physical characteristics of the unrestrained animal based on user input of measurements of the unrestrained animal in the at least one digital image;
- adjusting the physical characteristics of the unrestrained animal based on the calibrated animal size; and
- displaying the at least one digital image, adjusted measurements, computed measurements, a measurement summary, and estimated measurement errors on the graphical user interface.

* * * * *